(12) United States Patent
Pischl

(10) Patent No.: US 7,804,679 B2
(45) Date of Patent: Sep. 28, 2010

(54) COMPUTER DISPLAY ACCESSORY

(75) Inventor: John Pischl, Yorkville, IL (US)

(73) Assignee: A T Systems, Inc.

( * ) Notice: Subject to any disclaimer, the term of this patent is extended or adjusted under 35 U.S.C. 154(b) by 29 days.

(21) Appl. No.: 12/032,920

(22) Filed: Feb. 18, 2008

(65) Prior Publication Data
US 2009/0231789 A1 Sep. 17, 2009

(51) Int. Cl.
*G06F 1/16* (2006.01)

(52) U.S. Cl. .......................... 361/679.04; 361/679.55; 248/917

(58) Field of Classification Search ............ 361/679.55; 248/917
See application file for complete search history.

(56) References Cited

U.S. PATENT DOCUMENTS

| | | | | |
|---|---|---|---|---|
| 5,687,939 | A * | 11/1997 | Moscovitch | 248/122.1 |
| 6,094,341 | A * | 7/2000 | Lin | 361/679.04 |
| 6,343,006 | B1 * | 1/2002 | Moscovitch et al. | 361/679.04 |
| 6,487,068 | B1 * | 11/2002 | Rahemtulla | 361/679.04 |
| 6,504,706 | B2 * | 1/2003 | Stewart | 361/679.04 |
| 6,667,877 | B2 * | 12/2003 | Duquette | 361/679.04 |
| 6,667,878 | B2 * | 12/2003 | Ponx | 361/679.04 |
| 6,778,383 | B2 | 8/2004 | Ho | |
| 6,987,666 | B2 * | 1/2006 | Medica et al. | 361/679.05 |
| 7,061,472 | B1 * | 6/2006 | Schweizer et al. | 345/168 |
| 7,061,754 | B2 * | 6/2006 | Moscovitch | 361/679.21 |
| 7,136,282 | B1 * | 11/2006 | Rebeske | 361/679.55 |
| 7,203,059 | B1 * | 4/2007 | Kramer | 361/679.55 |
| 7,283,353 | B1 * | 10/2007 | Jordan et al. | 361/679.27 |
| 2002/0071246 | A1 | 6/2002 | Stewart | |
| 2004/0041062 | A1 * | 3/2004 | Ozolins et al. | 248/122.1 |
| 2005/0146845 | A1 * | 7/2005 | Moscovitch | 361/681 |
| 2007/0097609 | A1 * | 5/2007 | Moscovitch | 361/681 |
| 2007/0103856 | A1 * | 5/2007 | She | 361/681 |
| 2007/0247796 | A1 * | 10/2007 | Lin | 361/681 |
| 2008/0062625 | A1 * | 3/2008 | Batio | 361/680 |
| 2008/0225472 | A1 * | 9/2008 | Chih | 361/681 |

FOREIGN PATENT DOCUMENTS

| | | |
|---|---|---|
| EP | 1148409 | 10/2001 |
| JP | 2005173857 | 6/2005 |

* cited by examiner

*Primary Examiner*—Lisa Lea-Edmonds
(74) *Attorney, Agent, or Firm*—Marshall, Gerstein & Borun LLP; Richard M. LaBarge

(57) ABSTRACT

The disclosed computer accessory has a separate display that is connected to a computer through an interface. A base part is used to fit the accessory to the computer, and a swing arm connects the base part and the accessory display. For easy transport, the disclosed accessory is arranged so that the accessory display can be stored flat against the computer. For use, the swing arm enables the accessory display to be folded out into an operational position where it can be easily seen by others.

7 Claims, 6 Drawing Sheets

COMPUTER DISPLAY ACCESSORY

CROSS-REFERENCE TO RELATED APPLICATIONS

Not applicable.

BACKGROUND OF THE INVENTION

This invention relates generally to computer display accessories, and more particularly accessories used to improve the visibility of computer displays.

Most computers are primarily designed for displaying information to a single user. However, they are often used in presenting information to others. For example, they are often used in sales presentations or in providing services to customers. A sales person or service provider interested in making a presentation to a current or potential customer often wants the other individual to see the information on the computer. Turning the screen or sitting next to the other individual (so that both can see the screen simultaneously) is often awkward.

Separate computer monitors can be used, but may be cumbersome and inconvenient to transport.

Some computers are designed with dual screens. For example, Estari, Inc. has promoted a 2-VU™ Dual-Screen Mobile Computer that has two adjacent screens separated by a hinge. Nokia's U.S. Pat. No. 7,221,330 shows a similar arrangement of two screens. However, it would be awkward to use the second screen in these devices to display information to someone sitting opposite the main user. In addition, the second screen may often be unnecessary, making the investment in a dual-screen computer a questionable expense.

BRIEF SUMMARY

The applicant has developed a new computer display accessory that provides a more convenient alternative for allowing small groups of people to share information on a portable computer.

The accessory has a separate display that is electrically connected to a standard portable computer. The computer fits in or is attached to the accessory, and the two can be folded into a convenient transport configuration in which the display is stored flat against the computer. A swing arm connects the display to a base part and enables the display to be folded out into an operational position where it can be easily seen by others. The swing arm can also be detachable, and can be made to function as a separate stand for the display.

BRIEF DESCRIPTION OF THE DRAWINGS

The invention may be better understood by referring to the accompanying drawings, in which.

DETAILED DESCRIPTION

Figure 1:
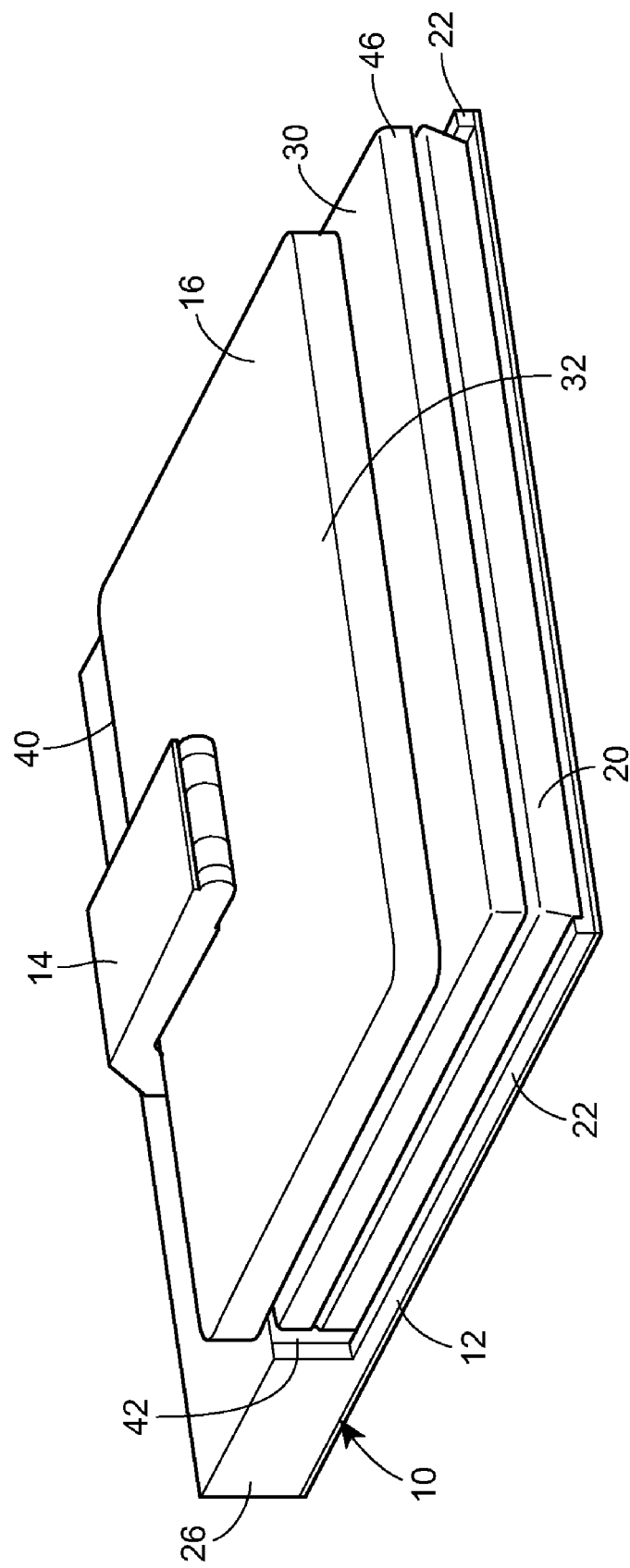
FIG. 1 is a perspective view of a computer configured with the accessory in a storage or transport configuration.

The accessory 10 shown in the figures has three primary parts: a base part 12, a swing arm 14, and a display 16. Each part will be discussed in turn.

The Base Part

The illustrated base part 12 is formed as a partial box or frame. It has a bottom panel 20, side walls 22, and a back module 26. The bottom panel and walls extend from and are spaced from the back module to form a recess that is sized to receive a conventional portable computer 30. In the illustrated example, the walls are made of plastic, and the recess is approximately 13" wide, approximately 9¼" long, and approximately ¼" deep. While these dimensions accommodate a wide range of portable computers that are currently sold or used, the size and shape can be varied to suit other sizes of computers. Adjustable sides are also possible.

The illustrated base part 12 is joined to the computer 30 by inserting the computer into the recess formed by the bottom panel 20, side walls 22, and back module 26. Although the manner of holding the computer and the accessory together is not important, it is preferred that the connection be secure enough to hold the accessory and the computer together as a single unit during transport, and to hold the accessory in place when the computer is in use. In the illustrated example, the weight of the computer resting on the bottom panel 20 may be enough to hold the accessory in place when the computer is in use.

When the illustrated unit is closed, the computer 30 is partly held in position by the display 16. A separate mechanism or case can be used to hold the display in the closed position and prevent the computer from slipping through the open front side of the recess during transport. For example, a strap or clip can be attached to a distal edge 32 of the display, extended over the front edge of the computer, and secured to a connector on the bottom panel 20. Such a strap or clip would hold the display closed against the bottom panel and secure the computer within the recess.

Other options are possible for holding the accessory 10 and the computer 30 together. For example, an adhesive-backed plate fastened to the computer can provide a mounting interface to the bottom panel 20. Alternatively, Velcro strips can be used. In some cases, a front wall or front wall segments can be extended from the forward edges of the side walls 22, at least partially closing the open front side of the recess. Such a wall or wall segments would engage the front edge of the computer when it is positioned in the recess.

Figure 6:
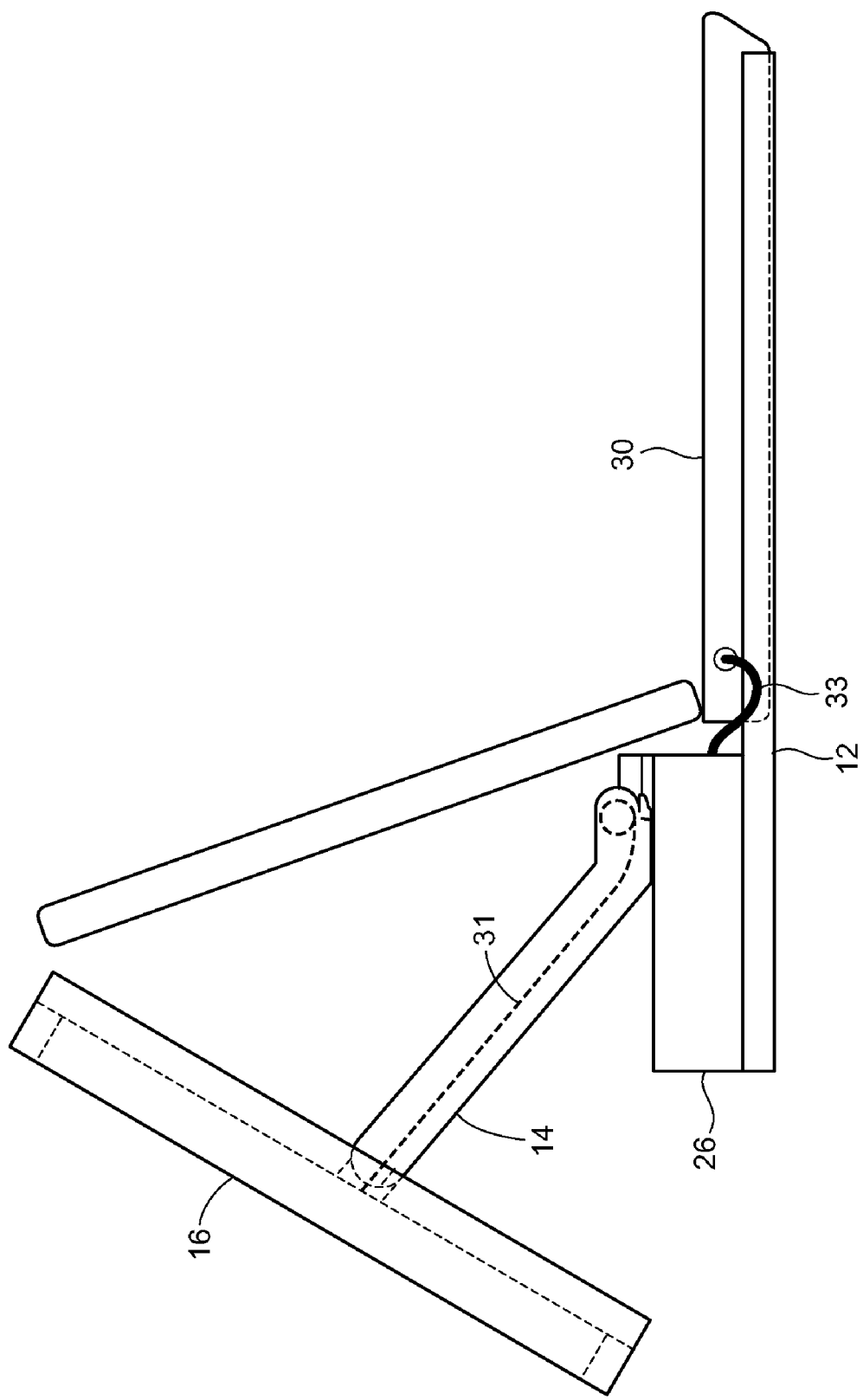
FIG. 6 is a side view of the computer and the accessory.

With the illustrated accessory 10, the back module 26 holds an auxiliary battery, a battery charger, a display power supply, and display electronics. While it will often be preferred for the base part 12 to be as narrow as possible (so that the overall width of a computer 30 and the attached accessory is still convenient to carry), it can also be used to provide storage for the display cable 31 and the computer video cable 33 (FIG. 6).

The computer video cable 33 electrically connects to the computer 30. The illustrated accessory 10 should have a display signal interface (not shown) at the end of the cable. This interface is used to carry a video signal from the computer to the display electronics inside the back module 26. In the 2008 market, a VGA interface would be used. Other types of interfaces can be used, depending upon preferences and existing market conditions.

The Display

The display cable 31 electrically connects the display electronics in the back module 26 to the display 16. The display image is controlled by the video signal that is output by the computer 30. In this case, the display can be powered by either the display power supply or the auxiliary battery in the back module.

In 2008, the auxiliary display 16 might use LCD flat-panel display screen technology. Later, or in other situations, other types of displays might be preferred. The illustrated display measures approximately 12" diagonally, and is roughly the same size as the screen of the computer 30. This similar sizing enables the display to fit efficiently on top of the computer, without either the display or the computer significantly overhanging the other.

The Swing Arm

As noted above, the display 16 and the base part 12 are connected by the swing arm 14. The swing arm articulates the display between a transport or storage configuration and an operational configuration in which the screen can be conveniently seen by a second viewer.

The transport or storage configuration is seen in FIG. 1. In this configuration, the display 16 is held flat against the computer 30. In the configuration illustrated here, a proximal edge 40 of the display is positioned near a back edge 42 of the computer and the distal edge 32 of the display is positioned near a front edge 46 of the computer. The screen of the display 16 lies against and faces the top of the computer, protecting the screen of the display from external damage during transport or storage, and creating a compact, portable unit.

Figure 4:
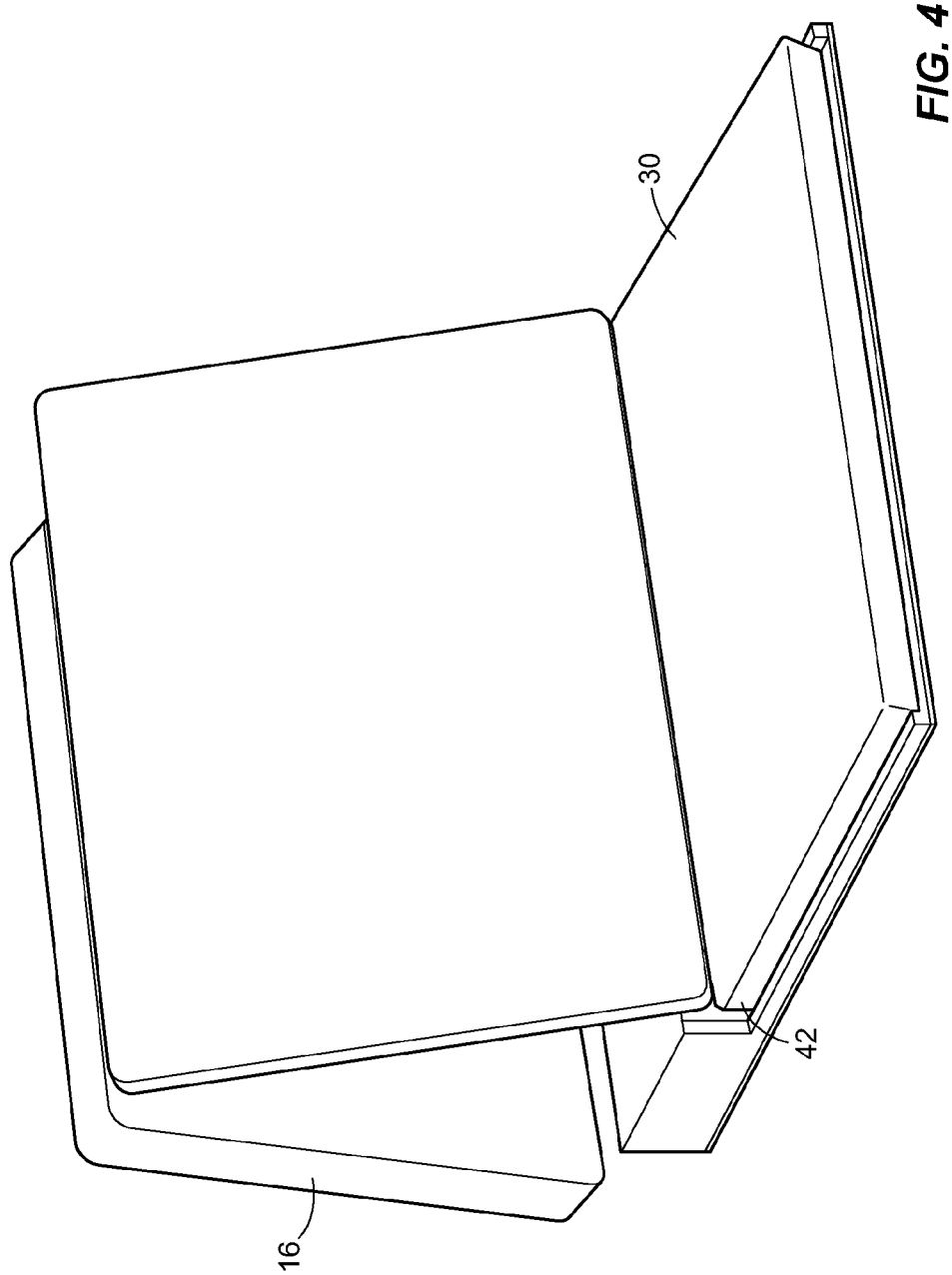
FIGS. 4 and 5 are perspective views of the computer and the accessory with the accessory in the use position and the computer open.
Figure 5:
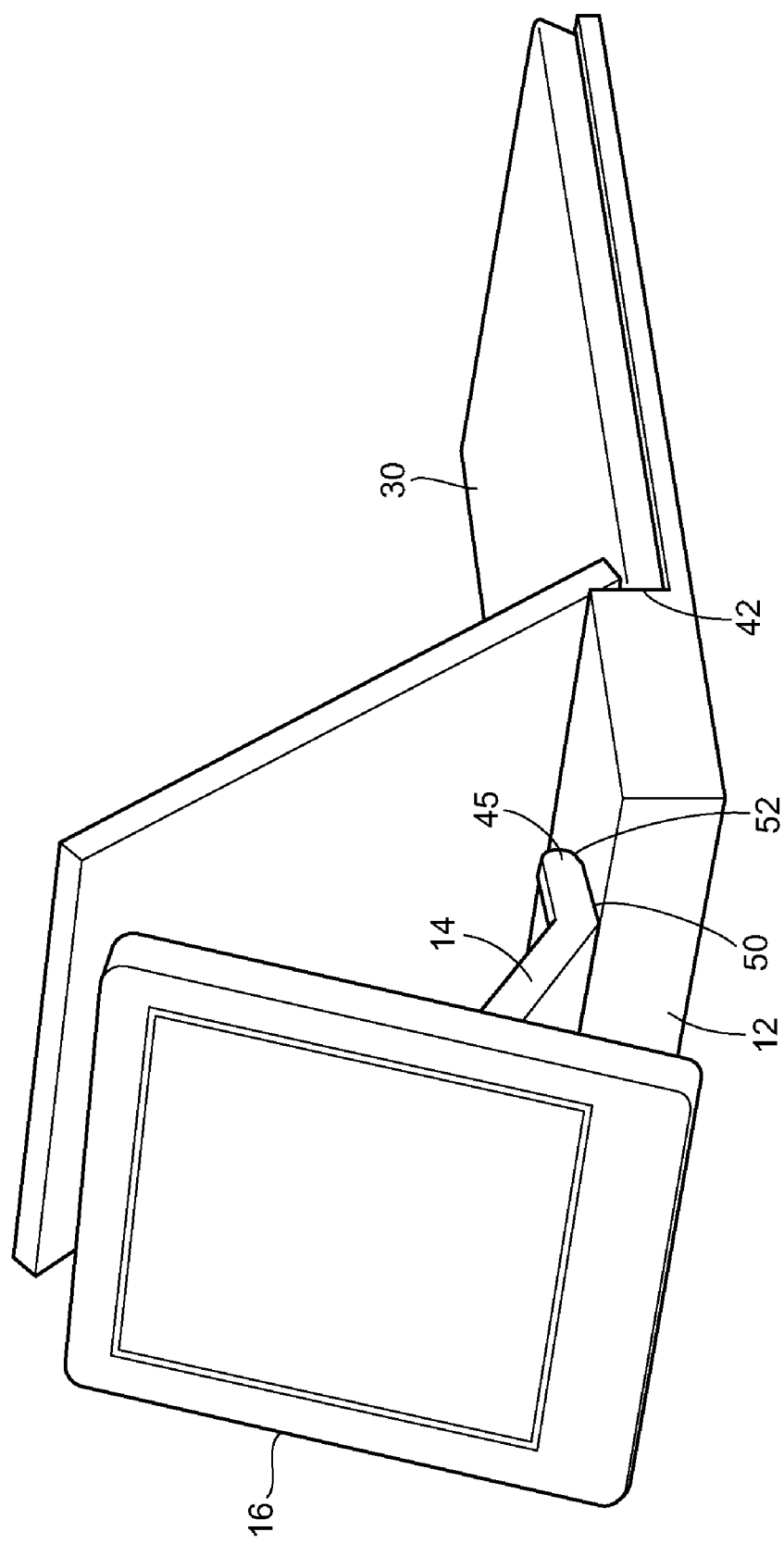

The operational configuration is seen in FIGS. 4 and 5 In this configuration, the computer 30 is opened, facing the user, and the display 16 faces away from the computer, enabling the user and a non-adjacent viewer to each watch a different screen.

To enable the accessory to be reconfigured from the transport or storage configuration to the operational configuration, the illustrated swing arm 14 is arranged so that it can rotate the display 16 away from the computer 30 along an axis parallel to the back edge 42 of the computer. The swing arm rotates about a lower hinge 45 (FIG. 2) between the swing arm and the base part 12. A travel limit is reached when a base edge 50 of the swing arm engages a supporting surface 52 on the base part.

In the illustrated example, this preliminary rotation of the swing arm 14 about the lower hinge 45 rotates the display 16 through a rotation of between 90° and 180°. Generally, it will be preferred that the rotation about the lower hinge be sufficient to move the center of gravity of the swing arm and the display from one side of the lower hinge to another: here, from in front of the lower hinge to behind it. In this example, the supporting surface 52 is a horizontal surface on the back module 26 and the angle of rotation about the lower hinge is approximately 135°.

Figure 3:
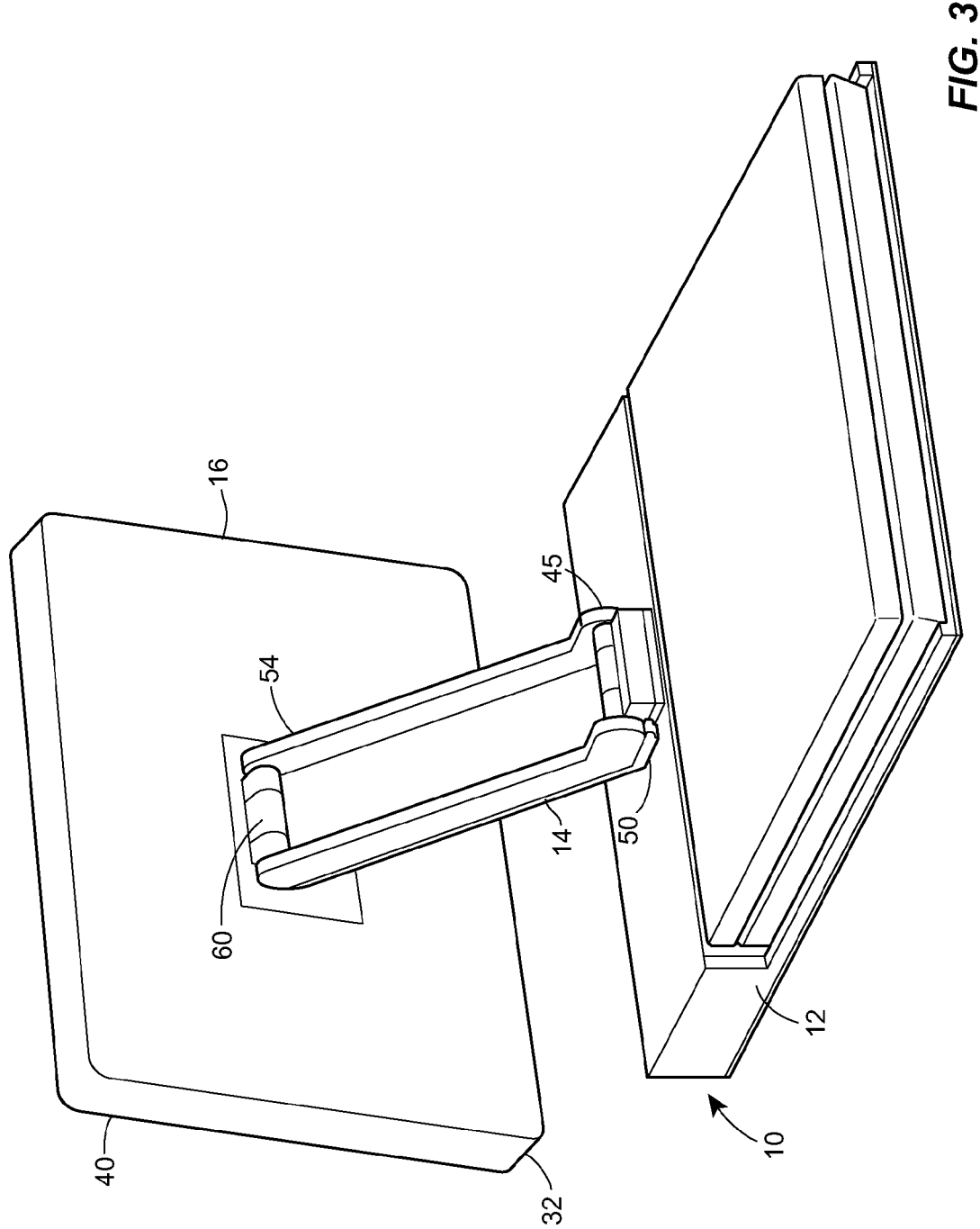
FIG. 3 is a perspective view of the computer and the accessory, with the auxiliary screen in the use position and the computer still closed.

At its travel limit, the illustrated swing arm 14 is supported in a position where its distal end 54 is positioned a distance above the base part 12 (see FIG. 3). In this position, the display 16 at the distal end of the swing arm is supported vertically by the swing arm.

Figure 2:
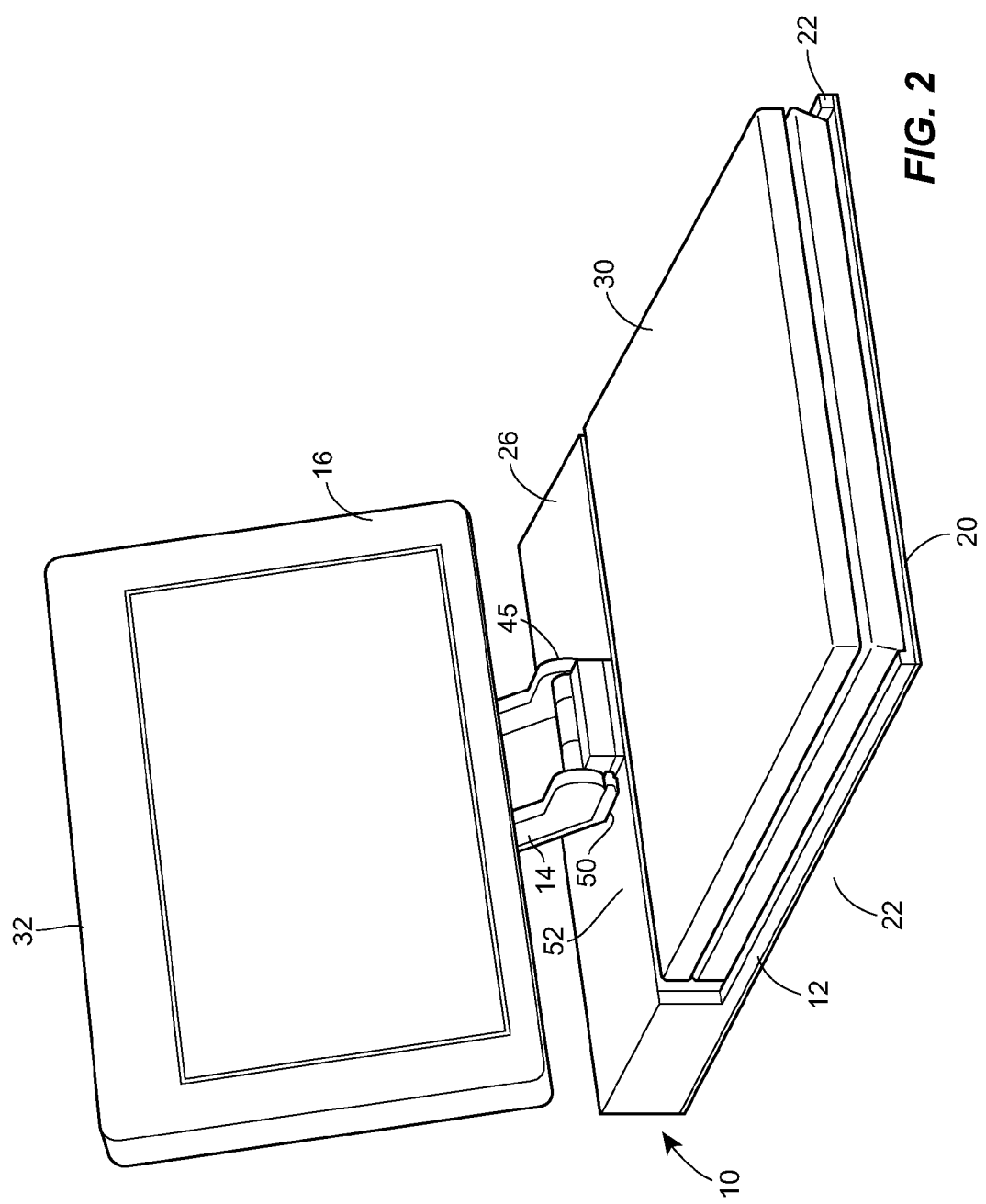
FIG. 2 is a perspective view of the computer and the accessory seen in FIG. 1, with the auxiliary screen of the display partially unfolded.

As seen in FIG. 2, the rotation of the swing arm 14 about the lower hinge 45 alone leaves the display 16 in a position where the distal edge 32 (which borders the lower edge of the screen) is above the proximal edge 40. In this position, a displayed video image would be upside down, and facing the same general direction as the portable computer 30.

A second hinge 60 on the swing arm 14 allows the display 16 to invert while rotating another 90°-135° to a position, seen in FIG. 3, facing away from the computer. In this final position, the distal edge 32 is now below the proximal edge 40, enabling the display to be easily viewed by additional individuals sitting opposite the computer user.

Preferably, the swing arm 14 and its base edge 50 are arranged so that, in the use position, the display 16 is suspended above the work surface that the base part 12 rests on. Appropriate hinging, such as the use of a suitable friction hinge, and balancing of the display about the second hinge 60 may enable the display to be held in space at a desired angle. A ball joint hinge or comparable hinge can also be used to enable the display to articulate not only vertically, but also horizontally.

To prevent toppling when the display 16 is supported above the work surface, care should be taken to assure that the center of gravity of the computer 30 and the accessory 10 remains safely within the footprint of the computer and the base part 12.

As an alternative to supporting the display 16 above the work surface, in some cases it might be preferred that the distal edge 32 of the display be positioned so that it rests against the work surface. The angle of the display with respect to the horizontal could then be adjusted by changing the distance between the distal edge of the display and the base part 12. To enable side-to-side rotation of the display, a hinge with a vertical axis could be used. For example, side-to-side rotation could be provided either at the joint between the base part and the swing arm 14, or at the joint between the swing arm and the display, or at both locations, or even at an intermediate hinge in the swing arm.

The illustrated swing arm 14 can sometimes be made detachable from the base part 12 at or near the lower hinge 45. When detached at that location, the swing arm can function as a support stand for the display 16. For example, a quick-release mechanical disconnect might be provided between the base part and the swing arm. In such an arrangement, the resistance of the second hinge 60 and friction against the work surface can prevent the swing arm and display from sliding apart. Other structural arrangements, such as mechanical stops or lines, could also be used to prevent the swing arm and display from sliding apart.

The invention can be adapted to other uses. For example, a computer or a computer workstation could be pre-equipped with a second display attached by the kind of swing arm discussed above.

This description of various embodiments of the invention has been provided for illustrative purposes. Revisions or modifications may be apparent to those of ordinary skill in the art without departing from the invention. The full scope of the invention is set forth in the following claims.

The invention claimed is:

1. A computer display accessory that has:
   a base part that fits against a portable computer;
   an auxiliary display; and
   a swing arm that connects the display to the base part and articulates the display between (a) an operational configuration in which the display faces away from the portable computer and (b) a transport configuration in which the display is held against the portable computer.

2. A computer display accessory as recited in claim 1, in which:
   the display has upper and lower edges; and
   the swing arm articulates the display between (a) an operational configuration in which the display faces away from the portable computer, and (b) a transport configuration in which the upper edge of the display is positioned near a back edge of the portable computer and the lower edge of the display is positioned near a front edge of the portable computer.

3. A computer display accessory that has:
a base part that fits against a portable computer;
an auxiliary display; and
a swing arm that (a) connects the display to the base part, (b) articulates the display between an operational configuration and a transport configuration, and (c) articulates the display about the width of the display through a rotation of more than 180 degrees.

4. A computer display accessory that has:
a base part that fits against a portable computer;
an auxiliary display;
a swing arm that connects the display to the base part and articulates the display between an operational configuration and a transport configuration; and
a connector on the swing arm that enables both horizontal and vertical adjustment of the display.

5. A computer display accessory that has:
a base part that fits against a portable computer;
an auxiliary display;
a swing arm that connects the display to the base part and articulates the display between an operational configuration and a transport configuration; and
a connector between the swing arm and the display that enables both horizontal and vertical adjustment of the display.

6. A portable computer that has:
a first display;
a second display;
a swing arm that articulates the first display between (a) an operational configuration in which the first display faces away from the second display, and (b) a transport configuration in which an upper edge of the first display is positioned near a lower edge of the second display and a lower edge of the first display is positioned near an upper edge of the second display.

7. A computer workstation that has:
a first display that connects to a computer:
a second display that connects to the computer;
a first hinge that connects the first display to one end of a swing arm and articulates the first display through a rotation of more 90 degrees with respect to the swing arm; and
a second hinge that connects an opposite end of the swing arm to the second display, and articulates the second display through a rotation of more 90 degrees with respect to the swing arm, enabling the second display to be moved from an operational configuration to a storage configuration in which the screen of the second display is covered.

* * * * *